UNITED STATES PATENT OFFICE.

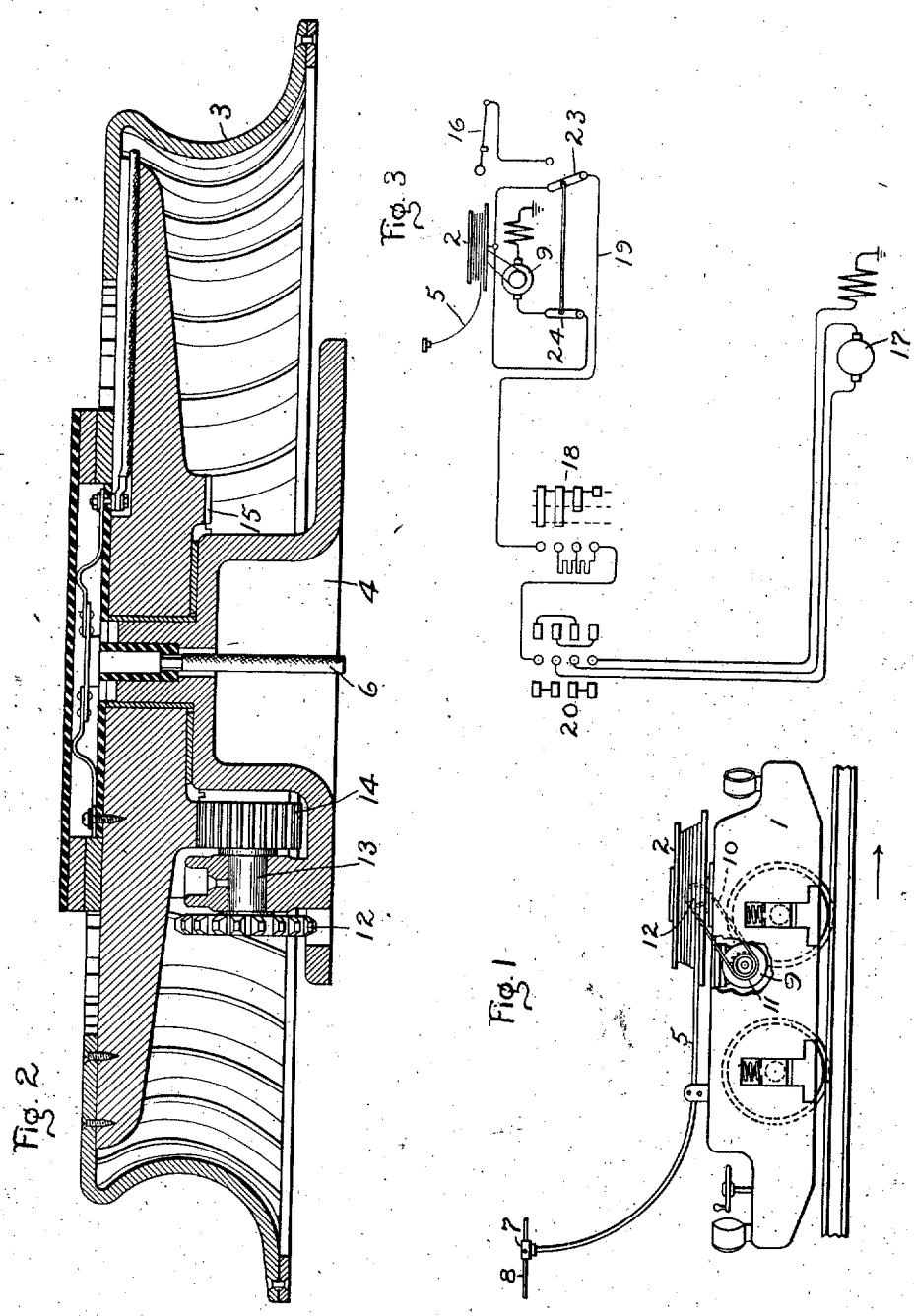

HARRY W. SHAVER, OF POCAHONTAS, VIRGINIA, ASSIGNOR TO GENERAL ELECTRIC COMPANY, A CORPORATION OF NEW YORK.

CABLE-REEL APPARATUS FOR MINING-LOCOMOTIVES.

No. 853,522.   Specification of Letters Patent.   Patented May 14, 1907.

Application filed June 7, 1906. Serial No. 320,565.

*To all whom it may concern:*

Be it known that I, HARRY W. SHAVER, a citizen of the United States, residing at Pocahontas, county of Tazewell, State of Virginia, have invented certain new and useful Improvements in Cable-Reel Apparatus for Mining-Locomotives, of which the following is a specification.

The present invention relates to mining locomotives and more particularly to means for controlling the flexible conductor which is used to permit the locomotive to gather cars from the mining faces of the rooms in mines.

The invention has for its object to provide a simple and inexpensive arrangement whereby the flexible conductor or cable is automatically paid out or is wound upon a reel carried by the locomotive, as the locomotive travels away from or toward the fixed supply conductor.

To the above end I connect to the cable reel a small electric motor, preferably of the series type, and energize this motor so as to cause it to exert a winding torque upon the reel both when the locomotive is traveling away from the fixed conductor and when moving toward it. As the locomotive approaches the fixed conductor, the motor winds up the cable and, by causing the motor to tend to run at a speed which will wind up the cable faster than the locomotive is traveling, a tension is placed upon the cable so that there is no danger of the cable becoming entangled or of being run over by the locomotive. As the locomotive travels in the other direction, the motor is pulled backward by the cable and the torque of the motor maintains the cable taut.

The invention will be more fully understood and its advantages will more clearly appear from the following detailed description taken in connection with the accompanying drawing, wherein Figure 1 shows in side elevation a mining locomotive provided with a cable reel operated in accordance with the present invention, a portion of the frame being broken away for the purpose of showing the cable-reel motor; Fig. 2 shows in cross-section a satisfactory form of reel; and Fig. 3 is a diagram of connections including not only the reel motor but also the propelling motor of the locomotive.

Reference being had to said drawing, 1 indicates a mining locomotive of any usual or preferred type; 2 is a cable reel of any usual or preferred type. Briefly stated, this reel comprises a rotatable member 3 mounted upon a base or support 4 arranged on the top of the locomotive and having one end of a flexible conductor or cable 5 secured thereto and electrically connected to a branch conductor 6 which leads to the control apparatus. At the free end of the cable 5 is any suitable means 7 for securing this end of the conductor to the fixed supply conductor 8. 9 is a motor, preferably a series motor, having a driving connection with the movable member of the reel. This connection may take any desired or preferred form, a convenient arrangement comprising a chain 10 passing over sprocket wheels 11 and 12 mounted respectively on the motor-shaft and upon a short shaft 13 journaled in a fixed support and provided at one end with a pinion 14 adapted to mesh with a gear-wheel 15 secured to the member 3. The driving connection is a permanent one, the present invention obviating the necessity of clutch apparatus of any kind for changing the connection between the motor and the reel when the locomotive is turned end for end.

In accordance with my invention, the motor 9 is always energized in the same direction independently of the direction of movement of the locomotive; being of course cut out when the locomotive is receiving current through the trolley 16.

In Fig. 3 I have shown means for controlling, not only the reel motor, but also the motor 17 which drives the locomotive. 18 is a controller of any usual type adapted to connect the motor 17 to a conductor 19 for either direction of rotation. 20 is the usual reversing switch for the motor 17. When the cable is in use the switch 23 is moved to the position shown, disconnecting trolley 16 from and connecting conductor 6, and therefore cable 5, to the conductor 19. At the same time a switch 24, which may be connected to the switch 23, as shown, completes the circuit between the motor 9 and the cable 5. Thus, when the reel is in use current is supplied to the reel motor in such direction that the motor exerts a winding torque upon the reel. The switch 24 may be combined with the controller 18, if desired, by providing an extra off position on the controller and arranging it so that the circuit of the reel motor 9 is closed when the controller 18 is either in its extra off position or in any operative position. The purpose of the extra off position is to permit the locomotive to coast with the circuit of the driving motor broken but with the reel motor energized. It is of course understood that instead of a single motor 17, any number of motors may be employed and that the controller may be of any usual or preferred type; these features of themselves forming no part of the present invention. Moreover, it is not essential that the circuit of the motor 9 be controlled from the main controller, although this is a convenient arrangement.

It will be seen that when the locomotive is moved in the direction of the arrow in Fig. 1, the cable, which is secured at one end to the fixed supply conductor, is unwound and, in unwinding, turns the motor 9 backward. Current is, however, flowing through the motor in such direction that it tends to wind up the cable and therefore the cable is maintained under a uniform tension. When the locomotive is slowed down or reversed, the motor immediately drives the reel in the opposite direction and positively prevents the formation of slack in the cable. Since the reel motor is always energized in the same direction no change need be made either in its circuit or in the connection between it and the reel when the locomotive is turned end for end, and thus the use of complicated clutch mechanism which has heretofore been required is avoided.

Although I have described my invention in detail as embodied in the best form now known to me, I do not desire to be limited to any particular embodiment except to the extent indicated in the appended claims.

What I claim as new, and desire to secure by Letters Patent of the United States, is,—

1. In combination, a vehicle adapted to move in forward and reverse directions, a winding device carried by said vehicle, and an electric motor having a driving connection with said winding device, said motor being connected and arranged to exert a winding torque upon said winding device during the movement of the vehicle in either direction.

2. In combination, a vehicle adapted to move in forward and reverse directions, a winding device carried by said vehicle, a series motor having a driving connection with said winding device, and means for energizing said motor so as to produce a winding torque upon said winding device during the movement of the vehicle in either direction.

3. In combination, a movable vehicle, a winding device for a flexible conductor carried by said vehicle, an electric motor having a driving connection with said winding device, a motor for driving said vehicle, and switch mechanism arranged to connect the motor for propelling the vehicle to the said conductor for rotation in either direction and to connect the other motor to the said conductor for rotation only in a direction to exert a winding torque upon said winding device.

4. In combination, a movable vehicle, a winding device carried thereby, a flexible conductor on said winding device, means for securing the free end of said conductor to a fixed conductor, an electric motor having a driving connection with said winding device, and means for connecting said motor to said flexible conductor for operation in a direction to exert a winding torque upon said winding device during the movement of the vehicle in either direction.

5. In combination, a movable vehicle, a winding device carried thereby, a flexible conductor on said winding device, means for securing the free end of said conductor to a fixed conductor, an electric motor having a driving connection with said winding device, and means for connecting said motor to said flexible conductor for operation in a direction to exert a winding torque upon said winding device during the movement of the vehicle in either direction, the arrangement being such that the motor tends to wind up the flexible conductor at a greater rate than the rate of movement of the vehicle.

In witness whereof, I have hereunto set my hand this 5th day of June, 1906.

HARRY W. SHAVER.

Witnesses:
BENJAMIN B. HULL,
HELEN ORFORD.